United States Patent
Hattori et al.

(10) Patent No.: US 9,882,505 B2
(45) Date of Patent: Jan. 30, 2018

(54) POWER CONVERSION UNIT AND POWER CONVERSION DEVICE

(71) Applicant: Hitachi, Ltd., Chiyoda-ku, Tokyo (JP)

(72) Inventors: Yukio Hattori, Tokyo (JP); Hiroshi Kamizuma, Tokyo (JP); Tetsuya Kawashima, Tokyo (JP); Akira Mima, Tokyo (JP); Daisuke Matsumoto, Tokyo (JP); Yuuichi Mabuchi, Tokyo (JP)

(73) Assignee: Hitachi, Ltd., Tokyo (JP)

(*) Notice: Subject to any disclaimer, the term of this patent is extended or adjusted under 35 U.S.C. 154(b) by 31 days.

(21) Appl. No.: 15/113,850

(22) PCT Filed: Mar. 2, 2015

(86) PCT No.: PCT/JP2015/056027
§ 371 (c)(1),
(2) Date: Jul. 25, 2016

(87) PCT Pub. No.: WO2016/047164
PCT Pub. Date: Mar. 31, 2016

(65) Prior Publication Data
US 2017/0040906 A1 Feb. 9, 2017

(30) Foreign Application Priority Data
Sep. 25, 2014 (JP) ................. 2014-194820

(51) Int. Cl.
*H02M 5/458* (2006.01)
*H02M 7/48* (2007.01)
*H02M 1/14* (2006.01)

(52) U.S. Cl.
CPC ............ *H02M 5/458* (2013.01); *H02M 1/14* (2013.01); *H02M 7/48* (2013.01)

(58) Field of Classification Search
CPC ...... H02M 5/45; H02M 5/4505; H02M 5/458; H02M 3/158; H02M 3/1588;
(Continued)

(56) References Cited

FOREIGN PATENT DOCUMENTS

| CA | 2 751 034 | 9/2010 |
|---|---|---|
| JP | 1-186176 A | 7/1989 |

(Continued)

OTHER PUBLICATIONS

International Search Report (PCT/ISA/210) issued in PCT Application No. PCT/JP2015/056027 dated May 19, 2015 with English translation (6 pages).
(Continued)

*Primary Examiner* — Yemane Mehari
(74) *Attorney, Agent, or Firm* — Crowell & Moring LLP

(57) ABSTRACT

The present invention reduces the footprint of a power conversion device. A first power semiconductor module and a second power semiconductor module are connected to a positive conductor, a negative conductor, and an alternating-current conductor. An external alternating-current terminal, the first power semiconductor module, the second power semiconductor module, a capacitor, and an external direct-current terminal including an external positive terminal and an external negative terminal are arrayed on a straight line extending in the longitudinal direction of a circuit connection section. The external alternating-current terminal is disposed at one longitudinal end of the circuit connection section. The external direct-current terminal is disposed at the other longitudinal end of the circuit connection section.

20 Claims, 17 Drawing Sheets

(58) Field of Classification Search
CPC ......... H02M 3/33507; H02M 3/33523; H02M 3/33515; H02M 3/33561; H02M 3/33569; H02M 3/33592; H02M 2001/0032; G05F 1/62; Y02B 70/1475; Y02B 70/1466
USPC ......... 363/21.01–21.18, 56.12, 62, 131, 132, 363/141; 257/77, 690–692, 729; 323/225, 234, 271, 272, 282–284
See application file for complete search history.

(56) References Cited

FOREIGN PATENT DOCUMENTS

| JP | 2012-95472 A | 5/2012 |
|----|----|----|
| JP | 2014-17134 | 9/2014 |
| WO | WO 2010/097830 A1 | 9/2010 |
| WO | WO 2012/098780 A1 | 7/2012 |

OTHER PUBLICATIONS

Japanese-language Written Opinion (PCT/ISA/237) issued in PCT Application No. PCT/JP2015/056027 dated May 19, 2015 (3 pages).

POWER CONVERSION UNIT AND POWER CONVERSION DEVICE

TECHNICAL FIELD

The present invention relates to a circuit for power conversion.

BACKGROUND ART

In a power conversion device, the loss in a power semiconductor is reduced because the speed of a switching operation is increased by technological innovations in the field, of power semiconductors used in a power semiconductor module, which is a main component of the power conversion device. Thus, a cooler for cooling the power semiconductor module can be downsized. As a result, the power conversion device is downsized. In particular, a UPS (Uninterruptible Power Supply) having the power conversion device is installed in an urban neighborhood where land prices are high, and is used for a data center. Therefore, it is preferred that the footprint of the power conversion device be small. Further, when power semiconductor modules forming a power conversion circuit in the power conversion device are connected in parallel and used to output a rated current, it is preferred that the currents flowing in the individual power semiconductor modules be balanced.

There is a well-known power conversion device that balances the currents flowing in parallel-connected power semiconductor modules. According to Patent Literature 1, a plurality of power semiconductor modules are arrayed so that their lateral surfaces are parallel to each other with respect to the direction in which terminal sections provided for the power semiconductor modules are arrayed. The power semiconductor modules are connected by an alternating-current conductor and a multilayer board formed of a positive conductor and a negative conductor. Further, the currents flowing in the individual power semiconductor modules are balanced by forming a cut-out portion in the alternating-current conductor.

CITATION LIST

Patent Literature

PTL 1: Japanese Patent Application Laid-Open No. 2012-95472

SUMMARY OF INVENTION

Technical Problem

However, if terminals are arrayed in the up-down direction of the power conversion device described in Patent Literature 1 because, for example, a reactor and other heavy parts to be connected to the power conversion device are disposed below the power conversion device, the power semiconductor modules are arrayed horizontally to increase the width of the power conversion device. This results in an increase in the footprint of the power conversion device.

Solution to Problem

In solving the above problem, according to an aspect of the present invention, there is provided a power conversion unit including a circuit connection section, a first power semiconductor module, a second power semiconductor module, and a capacitor. The circuit connection section includes a positive conductor having an external positive terminal, a negative conductor having an external negative terminal, and an alternating-current conductor having an external alternating-current terminal. The first power semiconductor module is connected to the positive conductor, the negative conductor, and the alternating-current conductor. The second power semiconductor module is connected to the positive conductor, the negative conductor, and the alternating-current conductor. The capacitor is connected to the positive conductor and the negative conductor. The first power semiconductor module includes a first direct-current terminal and a first alternating-current terminal. The first direct-current terminal includes a first positive terminal connected to the positive conductor and a first negative terminal connected to the negative conductor. The first alternating-current terminal is connected to the alternating-current conductor. The second power semiconductor module includes a second direct-current terminal and a second alternating-current terminal. The second direct-current terminal includes a second positive terminal connected to the positive conductor and a second negative terminal connected to the negative conductor. The second alternating-current terminal is connected to the alternating-current conductor. The external alternating-current terminal, the first power semiconductor module, the second power semiconductor module, the capacitor, and the external direct-current terminal including the external positive terminal and the external negative terminal are arrayed on a straight line extending in the longitudinal direction of the circuit connection section. The external alternating-current terminal is disposed at one longitudinal end of the circuit connection section, and the external direct-current terminal is disposed at the other longitudinal end of the circuit connection section.

Advantageous Effect of Invention

An aspect of the present invention makes it possible to reduce the footprint of a power conversion device including a plurality of parallel-connected power semiconductor modules.

BRIEF DESCRIPTION OF DRAWINGS

FIG. 16 is a perspective view illustrating a configuration of a power conversion section 2a.

FIG. 17 is a front view illustrating the configuration of the power conversion section 2a.

DESCRIPTION OF EMBODIMENT

An embodiment of the present invention will now be described with reference to the accompanying drawings.

A UPS (Uninterruptible Power Supply) will be described as the embodiment of the present invention.

Figure 1:
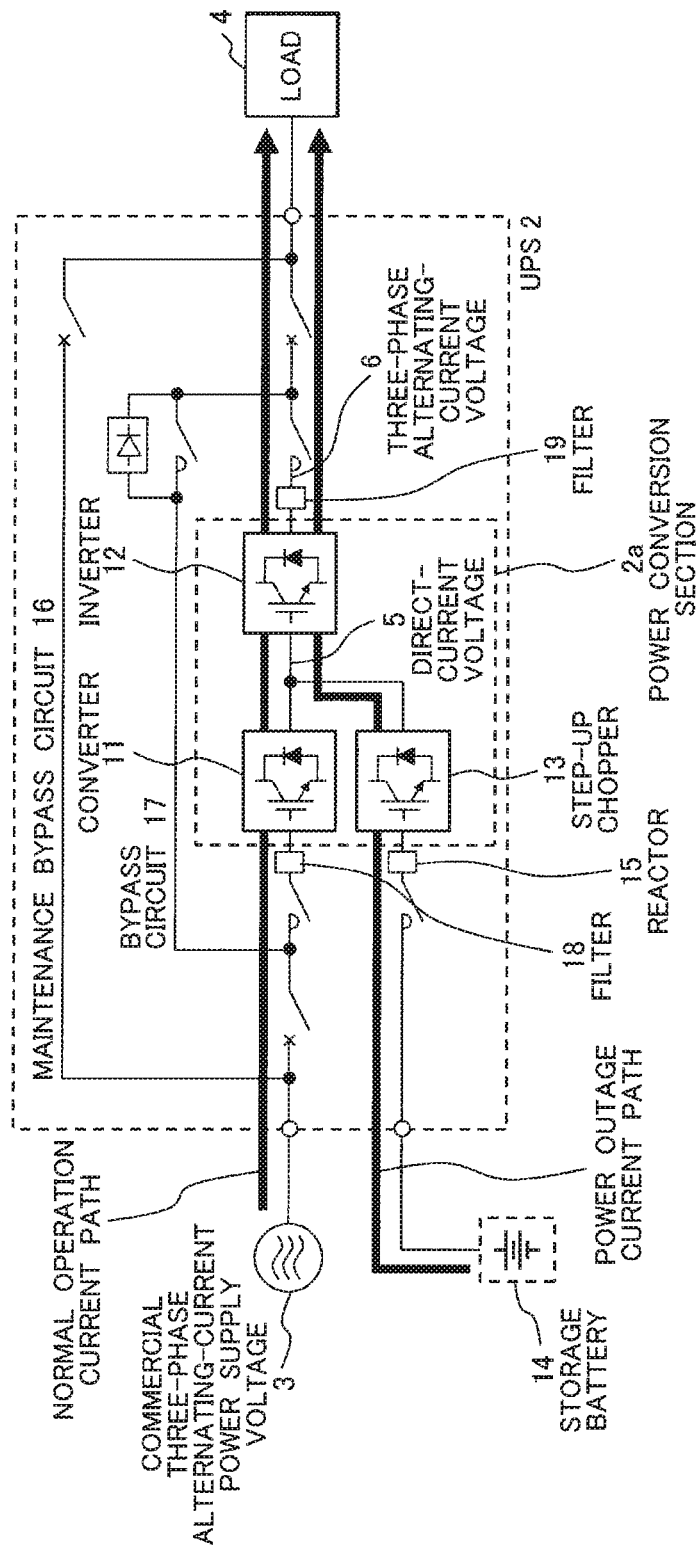
FIG. 1 illustrates a configuration of a UPS according to an embodiment of the present invention.

FIG. 1 illustrates a configuration of the UPS according to the embodiment of the present invention.

The UPS 2 uses a continuous inverter power supply method that is capable of continuously supplying electrical power during power outage. The present invention is applicable to not only the continuous inverter power supply method but also the other power supply methods such as a continuous commercial power supply method.

During a normal operation, a commercial three-phase alternating-current power supply voltage 3 supplies electrical power to a load 4 through a converter 11 and an inverter 12. The converter 11 converts commercial three-phase alternating-current power supply voltage 3 to a direct-current voltage 5 and supplies the direct-current voltage 5 to the inverter 12. The inverter 12 converts the direct-current voltage 5 to three-phase alternating-current power 6. This ensures that electrical power equivalent to normal commercial power is steadily supplied to the load 4 as control is exercised by the converter 11 and the inverter 12 even when the voltage of the commercial power supply 3 varies due, for instance, to an instantaneous voltage drop.

Meanwhile, in the event of power outage, a storage battery 14 supplies electrical power to the load 4 through the inverter 12 while the inverter 12 is activated. This enables the UPS 2 to uninterruptedly supply electrical power to the load 4. In the present embodiment, the total voltage of the storage battery 14 is made sufficiently lower than the direct-current voltage applied to the inverter 12 in order to reduce the cubic volume of the UPS 2. Thus, the UPS 2 according to the present embodiment includes a step-up chopper 13 that raises a low direct-current voltage, which is outputted by discharging the storage battery 14, to a desired direct-current voltage 5 and outputs the raised direct-current voltage to the inverter 12. If no limitation is imposed on the cubic volume of the UPS 2, the UPS 2 may exclude the step-up chopper 13 and include a high-voltage storage battery 14 capable of supplying a desired direct-current voltage.

A filter 18 is connected between the commercial power supply 3 and the converter 11 in order to shape a sine wave. The filter 18 includes, for example, a reactor and a capacitor, which are provided for each phase. One end of the reactor is series-connected to an alternating-current terminal of the converter 11. The capacitor is parallel-connected to the other end of the reactor. The filter 18 is a heavy part and therefore disposed directly below the converter 11. A filter 19 is connected between an alternating-current terminal of the inverter 12 and the load 4. The filter 19 includes, for example, a reactor and a capacitor, which are provided for each phase. One end of the reactor is series-connected to the alternating-current terminal of the converter 11. The capacitor is parallel-connected to the other end of the reactor. The filter 19 is a heavy part and therefore disposed directly below the inverter 12. A reactor 15 is connected between the storage battery 14 and an alternating-current terminal of the step-up chopper 13. The reactor 15 is a heavy part and therefore disposed directly below the step-up chopper 13.

In the subsequent description, the converter 11, the inverter 12, and the step-up chopper 13 are collectively referred to as the power conversion section 2a.

The UPS 2 may further include a cooling mechanism that air-cools the power conversion section 2a.

In compliance with an instruction, a bypass circuit 17 bypasses the power conversion section 2a and directly connects the commercial power supply 3 to the load 4. A maintenance bypass circuit 16 is used for the maintenance of the power conversion section 2a and the bypass circuit 17. In compliance with an instruction, the maintenance bypass circuit 16 bypasses the bypass circuit 17 and directly connects the commercial power supply 3 to the load 4.

Figure 2:
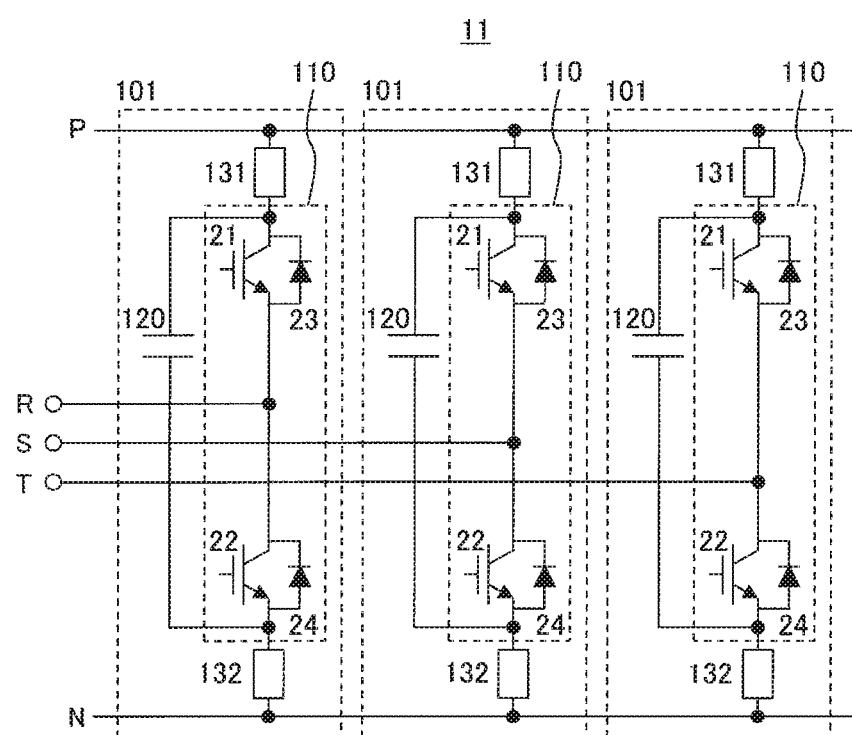
FIG. 2 illustrates a circuit configuration of a converter 11.

FIG. 2 illustrates a circuit configuration of the converter 11.

Three-phase alternating-current power from the commercial power supply 3 is supplied to alternating-current terminals R, S, T of the converter 11. In each of R, S, and T phases, the three-phase alternating-current power is rectified by a switching element 21 and rectifying element 23 of an upper arm, a switching element 22 and rectifying element 24 of a lower arm, and capacitors 120, and then outputted to direct-current terminals P, N. In the present embodiment, an IGBT (Insulated Gate Bipolar Transistor) is used as the switching elements 21, 22, and a diode is used as the rectifying elements 23, 24. However, different types of elements may alternatively be used.

Figure 3:
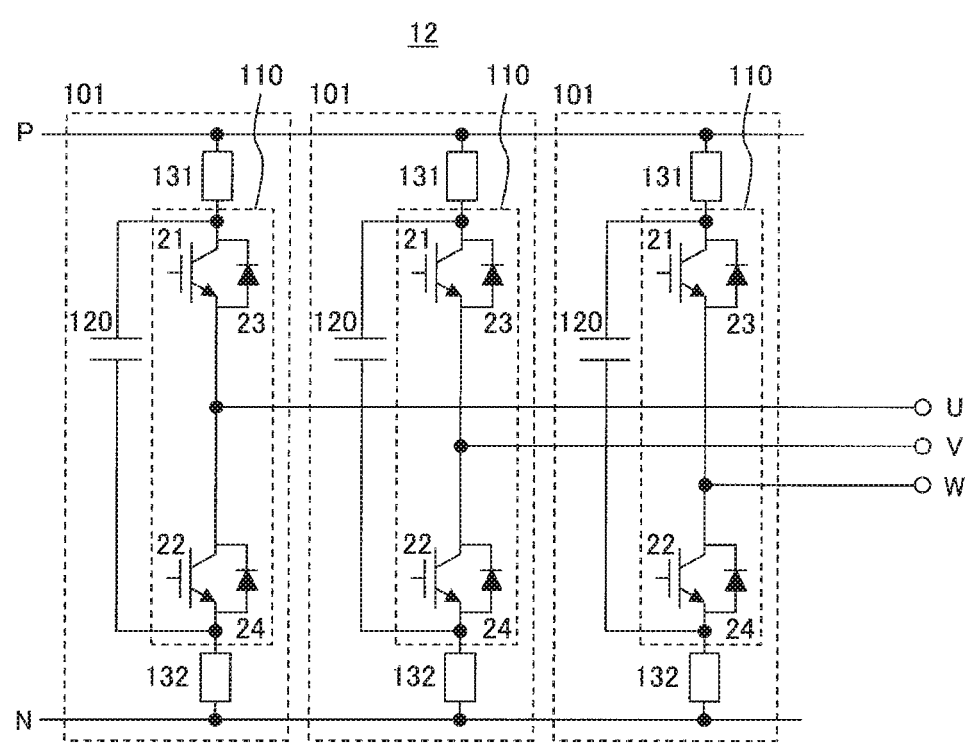
FIG. 3 illustrates a circuit configuration of an inverter 12.

FIG. 3 illustrates a circuit configuration of the inverter 12.

The direct-current voltage 5, which is obtained by conversion in the converter 11 or the step-up chopper 13, is supplied to the direct-current terminals P, N of the inverter 12. In each of U, V, and W phases, the direct-current voltage 5 is then converted to the alternating-current power 6 by the switching element 21 and rectifying element 23 of the upper arm, the switching element 22 and rectifying element 24 of the lower arm, and the capacitors 120, and outputted to alternating-current terminals U, V, W. Three-phase alternating currents outputted from the alternating-current terminals U, V, W are supplied to the load 4.

Figure 4:
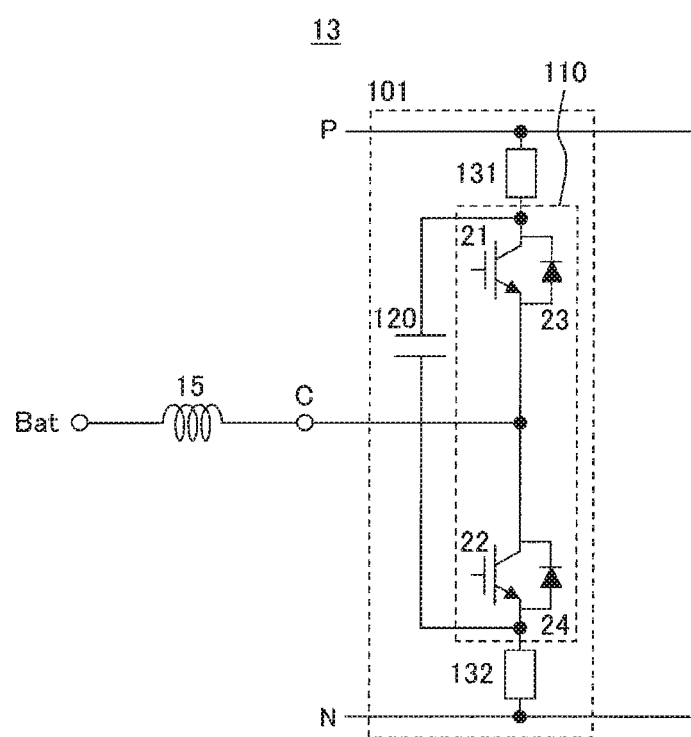
FIG. 4 illustrates a circuit configuration of a step-up chopper 13.

FIG. 4 illustrates a circuit configuration of the step-up chopper 13.

The output of the storage battery 14 is supplied to an input terminal Bat of the reactor 15. While the switching element 22 of the lower arm is ON, energy is stored in the reactor 15 connected between the input terminal Bat and an alternating-current terminal C. Subsequently, when the switching element 22 of the lower arm turns OFF, the reactor 15 generates a counter-electromotive voltage to turn ON the rectifying element 23 of the upper arm. A voltage obtained by adding a direct-current voltage outputted from the storage battery 14 to the counter-electromotive voltage of the reactor 15 is developed at output terminals P, N of the step-up chopper 13. Thus, a stepped-up direct-current voltage is outputted.

As described above, the converter 11 and inverter 12 included in the UPS 2 according to the present embodiment both have at least one basic circuit that includes power semiconductor modules 110, the capacitors 120, a positive fuse 131, and a negative fuse 132. Each of the power semiconductor modules 110 is a two-level half-bridge circuit that is formed by series-connecting the switching element 21 and rectifying element 23 of the upper arm to the switching element 22 and rectifying element 24 of the lower arm. A three or more multi-level conversion circuit may be used instead of the two-level half-bridge circuit.

In the present embodiment, the basic circuit is implemented by a power conversion unit 101, and power conversion units 101 are combined to implement the converter 11, the inverter 12, and the step-up chopper 13. This not only communizes the types of parts used for the power conversion section 2a, but also facilitates the assembly and maintenance of the power conversion section 2a.

Figure 5:
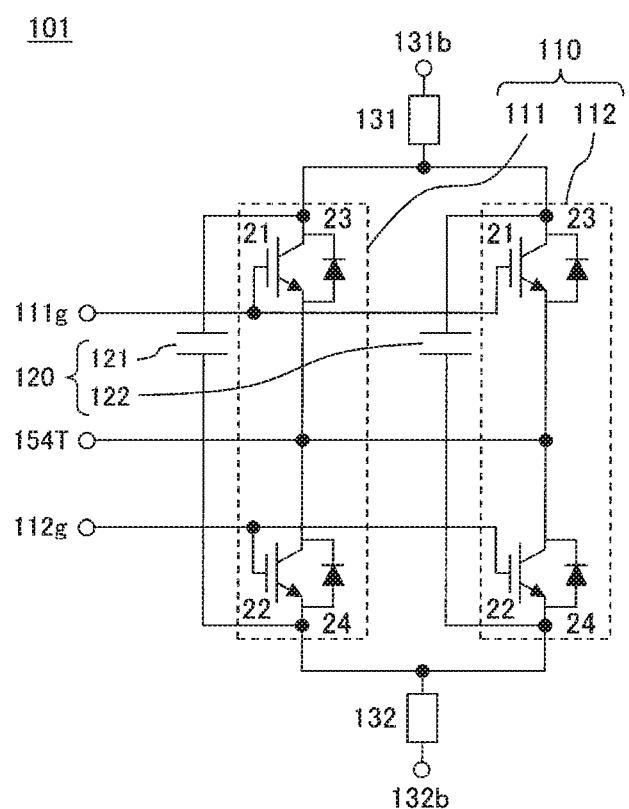
FIG. 5 illustrates a configuration of a power conversion unit 101.

FIG. 5 illustrates a configuration of the power conversion unit 101.

In the power conversion unit 101, the power semiconductor modules 110 are implemented by parallel-connecting a first power semiconductor module 111 and a second power semiconductor module 112. The first power semiconductor module 111 and the second power semiconductor module 112 are of a 2-in-1 type and used to form the upper and lower arms, respectively. Further, the capacitors 120 are implemented by parallel-connecting a first capacitor 121 and a second capacitor 122. In this manner, a plurality of power semiconductor modules and a plurality of capacitors are used to implement the power semiconductor modules 110 and the capacitors 120 in accordance with electrical power required for the power conversion unit 101.

Further, in the power conversion unit 101, the fuse 131 is series-connected to the positive ends of the power semiconductor modules 110 and capacitors 120, and the fuse 132 is series-connected to the negative ends of the power semiconductor modules 110 and capacitors 120. A second terminal 131b of the positive fuse 131 corresponds to the P terminals of the converter 11, inverter 12, and step-up chopper 13. A second terminal 132b of the negative fuse 132 corresponds to the N terminals of the converter 11, inverter 12, and step-up chopper 13. The fuses 131, 132 included in the power conversion unit 101 increase its reliability in the event of a short-circuit fault. In a situation where a circuit breaker is provided to isolate the power conversion unit 101, either or both of the fuses 131, 132 may be omitted.

The power semiconductor modules 111, 112 each include the switching element 21 and rectifying element 23 of the upper arm and the switching element 22 and rectifying element 24 of the lower arm. An external alternating-current terminal 154T is connected between the upper and lower arms of the power semiconductor modules 111, 112. A gate terminal of the upper arm switching elements 21 of the power semiconductor modules 111, 112 is connected to a gate terminal 111g. A gate terminal of the lower arm switching elements 22 of the power semiconductor modules 111, 112 is connected to a gate terminal 112g.

Figure 6:
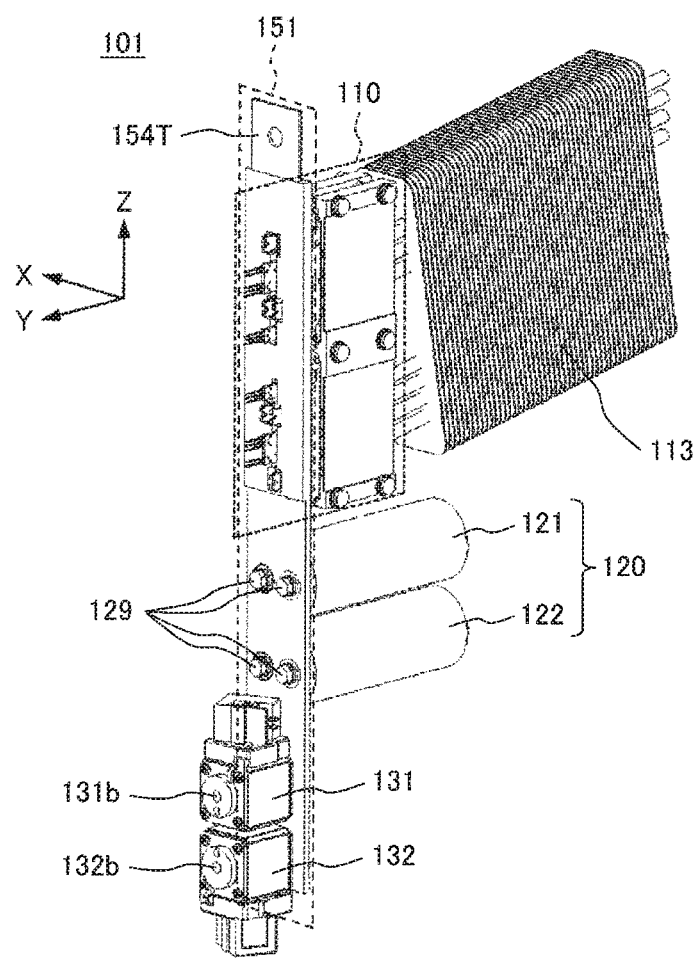
FIG. 6 is a perspective view illustrating the configuration of the power conversion unit 101.

FIG. 6 is a perspective view illustrating a configuration of the power conversion unit 101.

Coordinates of the UPS 2 are subsequently defined by using an X-axis, a Y-axis, and a Z-axis. The Y-axis direction is a forward direction of the UPS 2. The Z-axis direction is an upward direction of the UPS 2. The X-axis direction is a leftward direction of the UPS 2. The fuses 131, 132 are each provided with one terminal oriented in a rearward (−Y) direction and with the other terminal oriented in a forward (+Y) direction. Further, the fuses 131, 132 are disposed in the forward (+Y) direction with respect to the main circuit busbar assembly 151. More specifically, a first terminal 131a of the positive fuse 131 and a first terminal 132a of the negative fuse 132 are oriented in the rearward (−Y) direction and connected with a mounting screw 139 to the main circuit busbar assembly 151. Meanwhile, a second terminal 131b of the positive fuse 131 and a second terminal 132b of the negative fuse 132 are oriented in the forward (+Y) direction. When the above arrangement scheme is employed, the second terminal 131b of the positive fuse 131 and the second terminal 132b of the negative fuse 132, which serve as the terminals for coupling the host power conversion unit 101 to another power conversion unit 101, are positioned in the front of the UPS 2. This provides increased front accessibility during assembly and maintenance, thereby providing improved workability. As mentioned earlier, the power conversion unit 101 includes a total of three external terminals, namely, the second terminal 131b of the positive fuse 131 and the second terminal 132b of the negative fuse 132, which are connected to a unit coupling busbar assembly 161 for connecting to another power conversion unit 101, and the external alternating-current terminal 154T provided for the main circuit busbar assembly 151.

Figure 7:
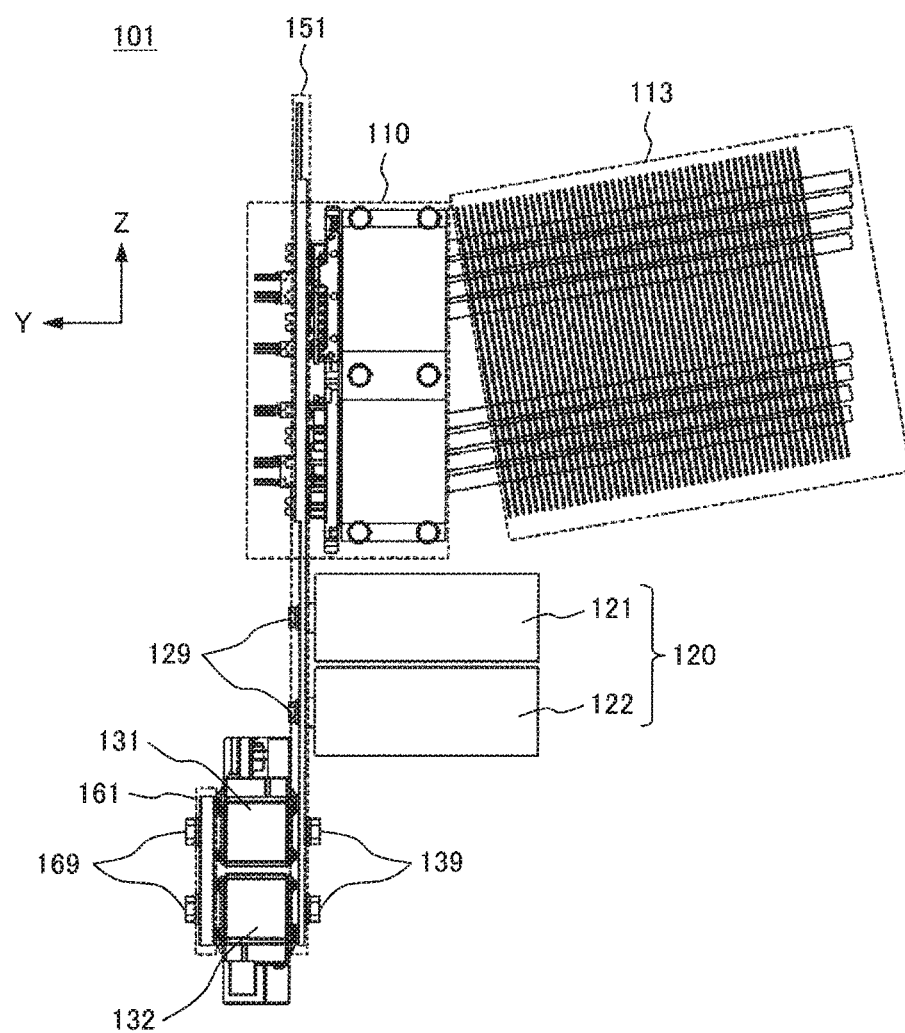
FIG. 7 is a right side view illustrating the configuration of the power conversion unit 101.

FIG. 7 is a right side view illustrating the configuration of the power conversion unit 101.

The power conversion unit 101 includes the power semiconductor modules 110, the capacitors 120, the fuses 131, 132, and the man circuit busbar assembly 151 that electrically connects the foregoing parts. An air-cooling fin 113 is disposed on the rear surface (−Y direction) of the power semiconductor modules 110 to cool them. The power semiconductor modules 110, the capacitors 120, and the fuses 131, 132 are disposed in the order named along a downward (−Z) direction. A housing is designed with a cooling mechanism incorporated so that air for cooling the air-cooling fin 113 flows in the upward (+Z) direction along the rear surface of the main circuit busbar assembly 151. This arrangement scheme is employed so that the air-cooling 113 is positioned leeward from the capacitors 120, that is, upward (+Z) from the capacitors, in order to prevent the capacitors 120 and other parts from receiving heat from the air-cooling fin 113. Further, the fuses 131, 132 having a high calorific value are disposed windward to be efficiently cooled. In the present embodiment, the air-cooling fin 113 is disposed in the −Y direction of the power semiconductor modules 110. However, if, for instance, the air flow path is oriented in the −Y direction, the air-cooling fin 113 may be disposed in the +Z direction of the power semiconductor modules 110. The direction in which the air-cooling fin 113 is disposed is determined in accordance with the air flow path. Moreover, as the power semiconductor modules 110 is positioned adjacent to the capacitors 120, it is possible to reduce parasitic inductance formed on the main circuit busbar assembly 151, which connects the power semiconductor modules 110 to the capacitors 120. Thus, a surge voltage generated upon switching can be reduced. Additionally, the impedance between the power semiconductor modules 110 in the host power conversion unit 101 and the capacitors 120 in a neighboring power conversion unit 101 can be minimized. This makes it possible to make effective use of not only the capacitors 120 in the host power conversion unit 101 but also the capacitors 120 in another power conversion unit 101. As a result, the capacitance of the capacitors that is used for one power conversion unit 101 can be reduced. In addition, the cubic volume of the power conversion unit 101 can also be reduced.

The power semiconductor modules 110 and the capacitors 120, which have terminals protruding in the forward (+Y) direction, are disposed in the rearward (−Y) direction with respect to the main circuit busbar assembly 151. This arrangement scheme ensures that all the terminals of the power semiconductor modules 110 and capacitors 120 are positioned forward. This makes it easy, for example, to inspect, install, or remove terminal sections during maintenance.

Figure 8:
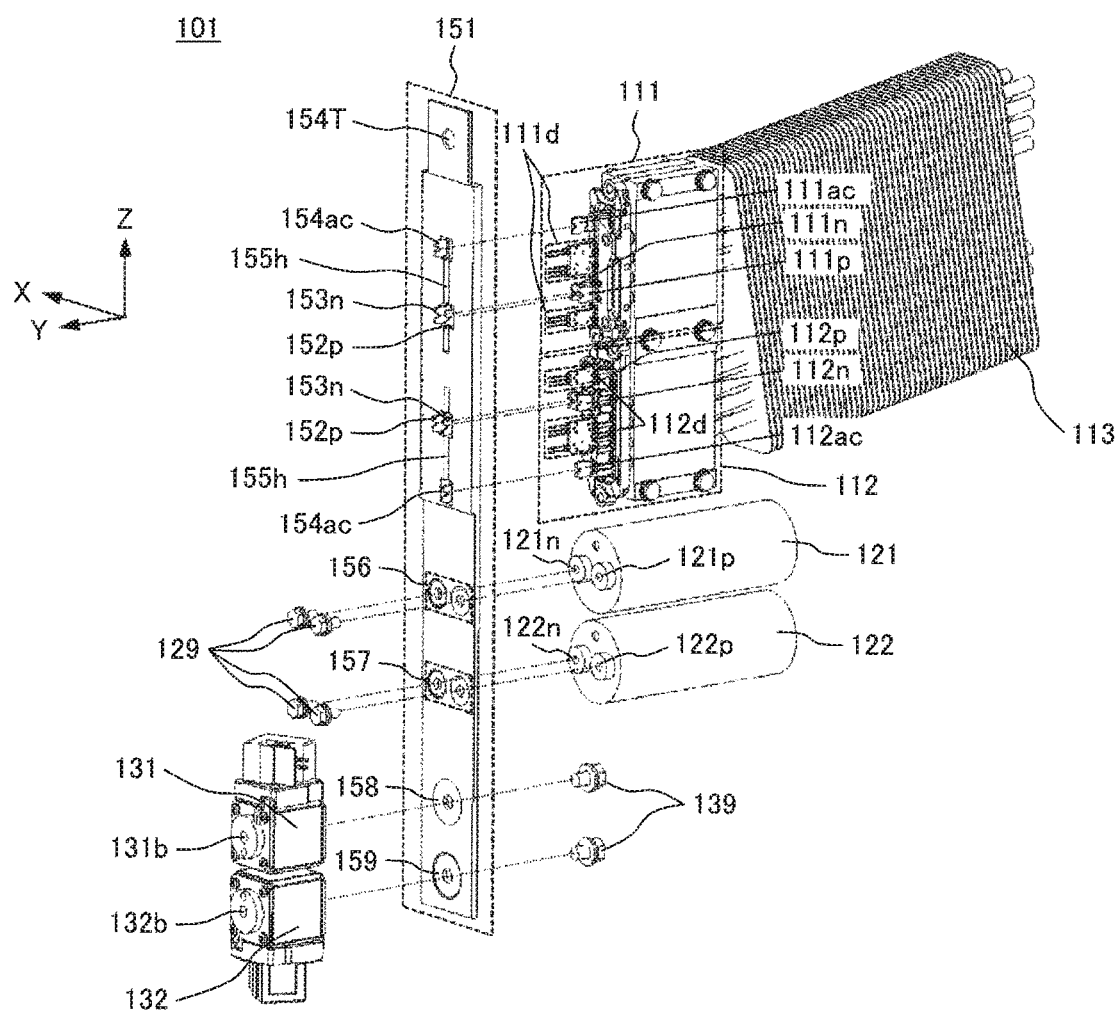
FIG. 8 is an exploded perspective view illustrating a front configuration of the power conversion unit 101.
Figure 9:
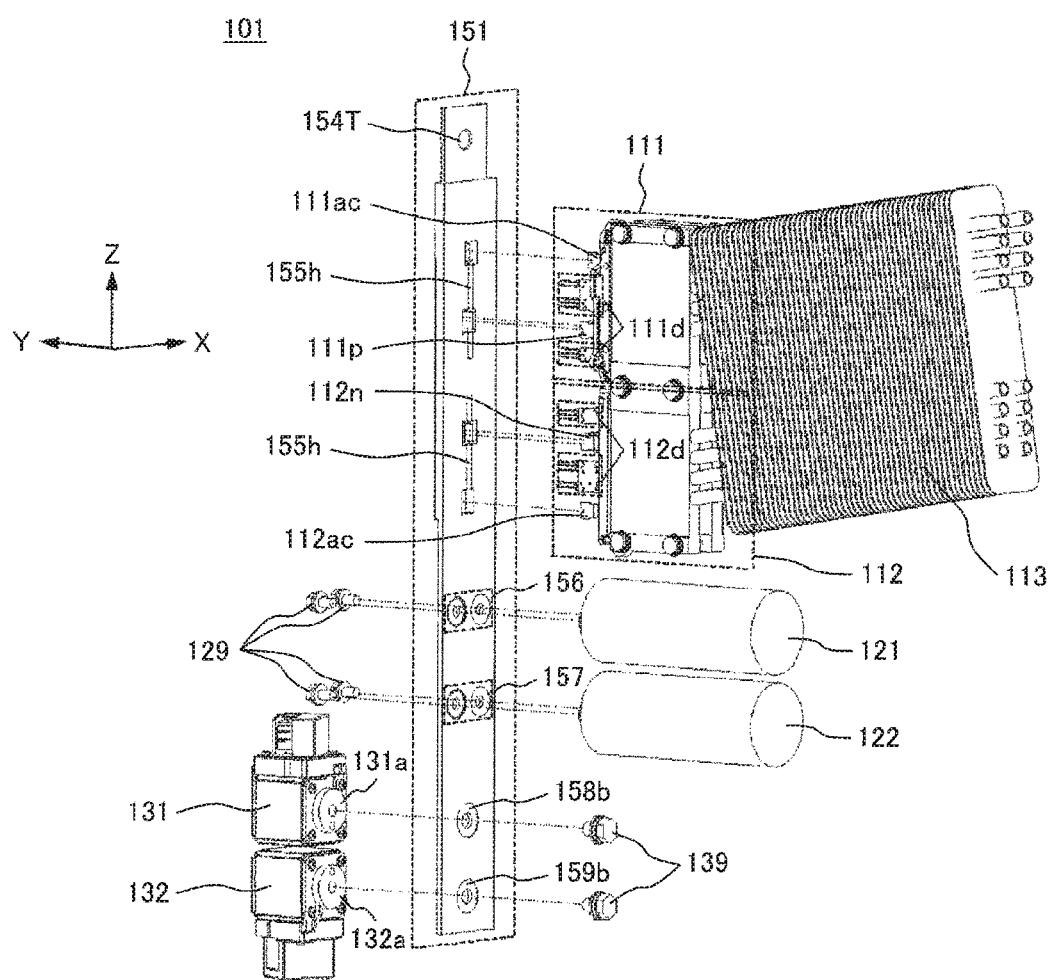
FIG. 9 is an exploded perspective view illustrating a rear configuration of the power conversion unit 101.

FIG. 8 is an exploded perspective view illustrating a front configuration of the power conversion unit 101. FIG. 9 is an exploded perspective view illustrating a rear configuration of the power conversion unit 101.

In the present embodiment, the power semiconductor modules 110 are incorporated by parallel-connecting the power semiconductor module 111 and the power semiconductor module 112, which are two-level half-bridge circuits (2 in 1). The number of parallel-connected power semiconductor modules in the power conversion unit 101 is preferably a minimum required number of power semiconductor modules that permit minimum electrical power provided by a model selected for the line-up of a UPS or other power conversion device using the power conversion unit 101. The reason is that a desired amount of electrical power can be obtained by parallel-connecting the power conversion units 101 as for a model that requires a larger amount of electrical power. In consideration of the above, the present embodiment is configured so that two power semiconductor modules are connected in parallel.

The power semiconductor modules 111, 112 respectively include positive terminals 111p, 112p, negative terminals 111n, 112n, alternating-current terminals 111ac, 112ac, and control terminals 111d, 112d. The control terminals 111d, 112d include gate terminals 111g, 112g, respectively.

The positive terminals 111p, 112p in the power semiconductor modules 110 are connected to a positive connection terminal 152p in the main circuit busbar assembly 151. The negative terminals 111n, 112n in the power semiconductor modules 110 are connected to a negative connection terminal 153n in the main circuit busbar assembly 151. The alternating-current terminals 111ac, 112ac in the power semiconductor modules 110 are connected to a connection terminal 154ac connected to the external alternating-current terminal 154T. The positive terminals 111p, 112p, the negative terminals 111n, 112n, and the alternating-current terminals 111ac, 112ac are connected to the main circuit busbar assembly 151 by a welding or other joining method. These terminals may alternatively be connected to the main circuit busbar assembly 151 by using, for example, screws or clips.

In order to suppress the difference between the distance from the capacitors 120 to the positive terminal hip and negative terminal 111n of the power semiconductor module 111 and the distance from the capacitors 120 to the positive terminal 112p and negative terminal 112n of the power semiconductor module 112, the positive terminal 111p and negative terminal 111n of one power semiconductor module 111 are positioned in a reverse manner from the positive terminal 112p and negative terminal 112n of the other power semiconductor module 112. Further, the positive terminal 111p and negative terminal 111n in the power semiconductor module 111 face each other in proximity, and the positive terminal 112p and negative terminal 112n in the power semiconductor module 112 face each other in proximity. Thus, in the XZ-plane, the power semiconductor module 112 is positioned in a reverse manner from the power semiconductor module 111. Using the arrangement scheme reduces the difference in the impedance between the power semiconductor modules 111, 112 and the capacitors 121, 122. This provides an improved balance between the current flowing in the power semiconductor module 111 and the current flowing in the power semiconductor module 112.

The positive terminal 121p and negative terminal 121n of the capacitor 121 are fastened with capacitor mounting screws 129 to a capacitor joint 156 provided for the main circuit busbar assembly 151. Similarly, the positive terminal 122p and negative terminal 122n of the capacitor 122 are fastened with the capacitor mounting screws 129 to a capacitor joint 157 provided for the main circuit busbar assembly 151.

Figure 10:
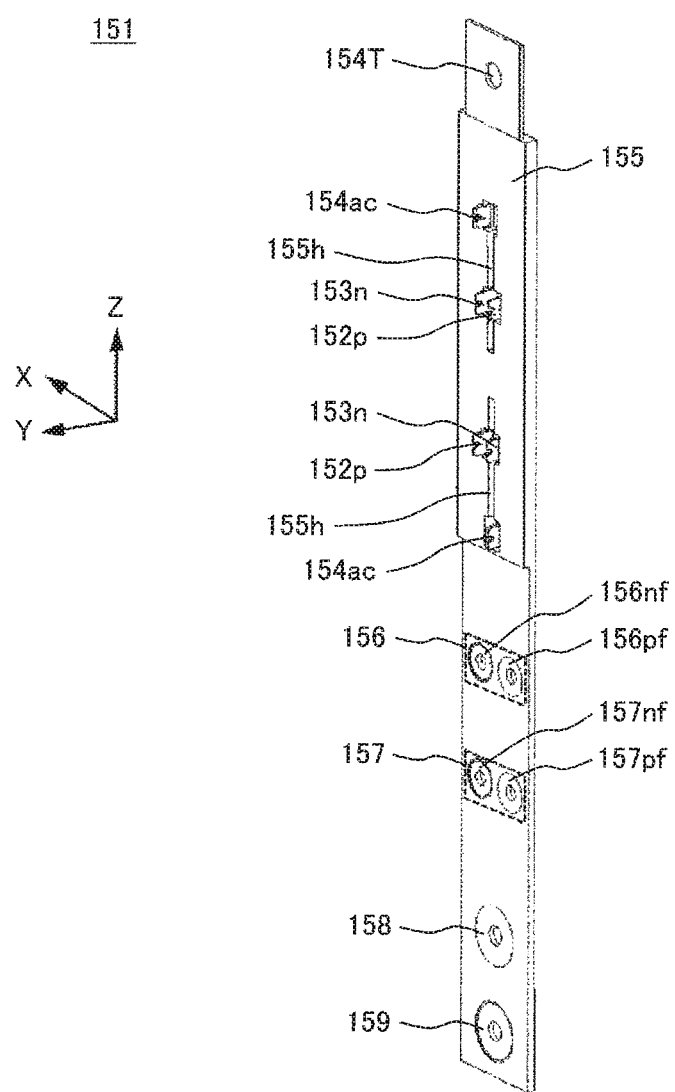
FIG. 10 is a perspective view illustrating a front configuration of a main circuit busbar assembly 151.
Figure 11:
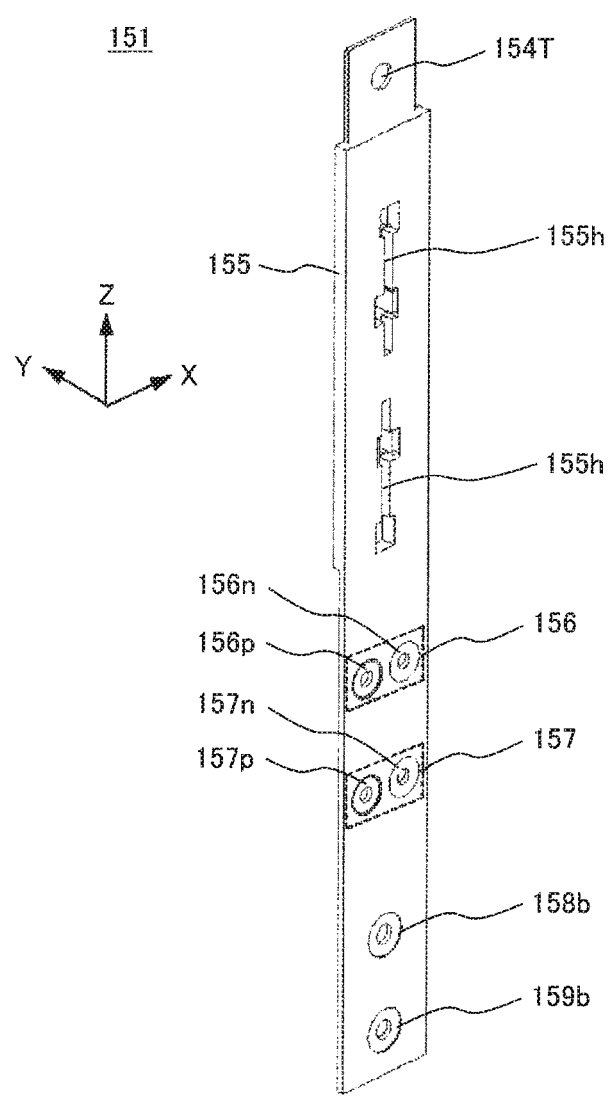
FIG. 11 is a perspective view illustrating a rear configuration of the main circuit busbar assembly 151.

FIG. 10 is a perspective view illustrating a front configuration of the main circuit busbar assembly 151. FIG. 11 is a perspective view illustrating a rear configuration of the main circuit busbar assembly 151.

Capacitor connection sections 156p, 156n are attached to the rear surface of the capacitor joint 156, and capacitor connection sections 157p, 157n are attached to the rear surface of the capacitor joint 157. Capacitor mounting screw connection sections 156pf, 156nf are disposed opposite the capacitor connection sections 156p, 156n on the main circuit busbar assembly 151, and capacitor mounting screw connection sections 157pf, 157nf are disposed opposite the capacitor connection sections 157p, 157n on the main circuit busbar assembly 151. The positive terminal 121p and negative terminal 121n of the capacitor 121 are fastened to the rear surface of the capacitor joint 156 by using the capacitor mounting screws 129 on the front of the capacitor joint 156. This ensures that the positive terminal 121p and negative terminal 121n of the capacitor 121 are in contact with the capacitor connection sections 156p, 156n, respectively, and that the capacitor mounting screws 129 are in contact with the capacitor mounting screw connection sections 156pf, 156nf. Further, the positive terminal 122p and negative terminal 122n of the capacitor 122 are fastened to the rear surface of the capacitor joint 157 by using the capacitor mounting screws 129 on the front of the capacitor joint 157. This ensures that the positive terminal 122p and negative terminal 122n of the capacitor 122 are in contact with the capacitor connection sections 157p, 157n, respectively, and that the capacitor mounting screws 129 are in contact with the capacitor mounting screw connection sections 157pf, 157nf.

Fuse connection sections 158, 159 are attached to the front surface of the main circuit busbar assembly 151. Fuse mounting screw connection sections 158b, 159b are disposed opposite the fuse connection sections 158, 159 on the main circuit busbar assembly 151. The first terminal 131a of the positive fuse 131 is fastened to the front surface of the fuse connection section 158 by using a fuse mounting screw 139 on the rear of the fuse mounting screw connection section 158b. This ensures that the first terminal 131a of the positive fuse 131 is in contact with the fuse connection section 158, and that the fuse mounting screw 139 is in contact with the fuse mounting screw connection section 158b. Further, the first terminal 132a of the negative fuse 132 is fastened to the front surface of the fuse connection section 159 by using the fuse mounting screw 139 on the rear of the fuse mounting screw connection section 159b. This ensures that the first terminal 132a of the negative fuse 132 is in contact with the fuse connection section 159, and that the fuse mounting screw 139 is in contact with the fuse mounting screw connection section 159b.

Figure 12:
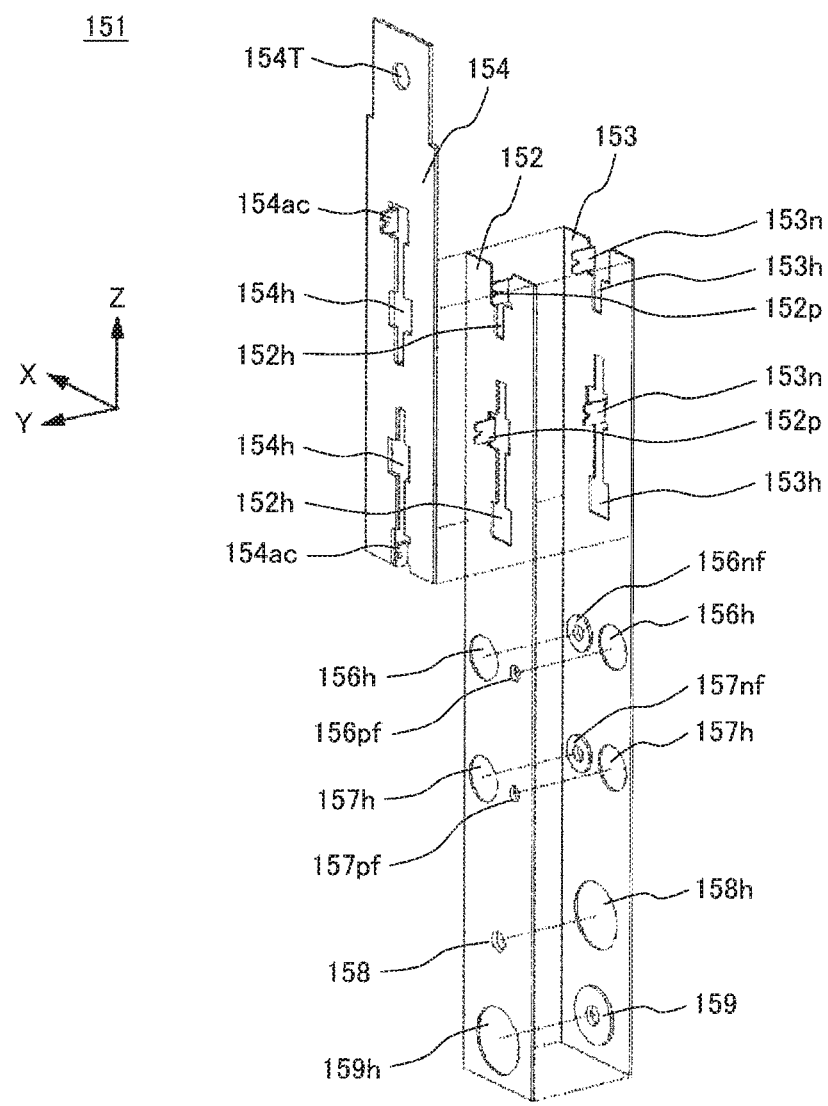
FIG. 12 is an exploded perspective view illustrating the front configuration of the main circuit busbar assembly 151.
Figure 13:
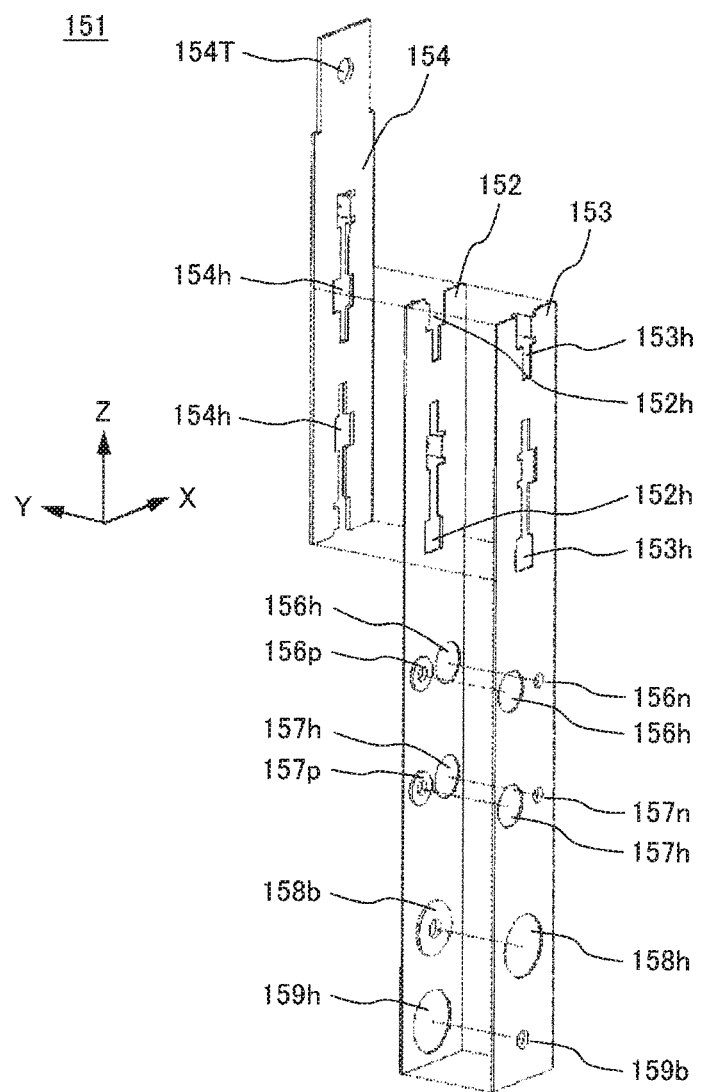
FIG. 13 is an exploded perspective view illustrating the rear configuration of the main circuit busbar assembly 151.

FIG. 12 is an exploded perspective view illustrating the front configuration of the main circuit busbar assembly 151. FIG. 13 is an exploded perspective view illustrating the rear configuration of the main circuit busbar assembly 151.

The main circuit busbar assembly 151 includes a positive conductor 152, a negative conductor 153, an alternating-current conductor 154, and an insulator 155. The positive conductor 152, the negative conductor 153, and the alternating-current conductor 154 are shaped like a flat plate. In order to reduce parasitic inductance generated between the power semiconductor modules 110 and the capacitors 120, the positive conductor 152 and the negative conductor 153 are stacked via the insulator 155 so that their opposing faces are parallel and close to each other. This makes it possible to reduce current ripple and impedance in the main circuit busbar assembly 151 and reduce a surge voltage generated upon switching. Further, the insulator 155 covers a large portion of the stacked conductors, namely, the positive conductor 152, the negative conductor 153, and the alternating-current conductor 154, in such a manner that the conductors are at a predetermined insulating distance from each other. In order to provide improved heat dissipation, the front and rear conductive surfaces of the main circuit busbar assembly 151 may be exposed while the predetermined insulating distance is maintained. The insulator 155 is formed, for instance, of highly-fluid insulative resin.

In the present embodiment, the alternating-current conductor 154, the positive conductor 152, and the negative conductor 153 are disposed in the order named along the rearward (−Y) direction. However, as far as the positive conductor 152 and the negative conductor 153 are disposed nearest each other, the parasitic inductance remains unaffected even if the conductors are disposed in a different order. The conductors are formed, for instance, by cutting, bending, or otherwise working a single conductive plate made of copper, aluminum, or other highly conductive material. As an example, the positive conductor 152 is described below. The positive conductor 152 is formed by initially cutting out an opening 152h through which all the terminals 111p, 111n, 111ac, 111d, 112p, 112n, 112ac, 112d of the power semiconductor modules 111, 112 penetrate while a portion serving as the connection terminal 152p for connecting to the positive terminals 11p, 112p is left in the plane of a single conductive plate. The connection terminal 152p is then formed by bending the portion left in the plane of the conductive plate, which serves as the connection terminal 152p, 90 degrees in the forward (+Y) direction. The above-described forming method also applies to the negative conductor 153 and the alternating-current conductor 154.

The positive conductor 152 includes two connection terminals 152p that are respectively connected to the positive terminals 111p, 112p of the power semiconductor modules 110. The negative conductor 153 includes two connection terminals 153n that are respectively connected to the negative terminals 111n, 112n of the power semiconductor modules 110. The alternating-current conductor 154 includes two connection terminals 154ac that are respectively connected to the alternating-current terminals 111ac, 112ac of the power semiconductor modules 110, and the external alternating-current terminal 154T to be connected to the outside.

At the capacitor joints 156, 157, the negative terminals 121n, 122n of the capacitors 121, 122 are brought into contact with the capacitor connection sections 156n, 157n on the rear surface of the negative conductor 153. Further, the capacitor connection sections 156p, 157p, which protrude in the rearward (−Y) direction from the positive conductor 152, are disposed so that the positive terminals 121p, 122p of the capacitors 121, 122 are brought into contact with a conductor in a virtual plane identical with the rear surface of the negative conductor 153. The capacitor connection sections 156p, 157p are separate from the positive conductor 152 and connected to the positive conductor 152, for instance, by brazing, soldering, or swaging. Further, the capacitor connection sections 156p, 157p can also be manufactured by a cutting method for creating the capacitor connection sections 156p, 157p protruding from a single conductive plate, or by a casting method such as die-casting. The capacitor connection sections 156p, 157p are provided with holes into which the capacitor mounting screws 129 are driven. The negative conductor 153 is provided with openings 156h, 157h that prevent the protruding positive capacitor connection sections 156p, 157p from coming into contact with the negative conductor 153.

Further, at the capacitor joints 156, 157, the capacitor mounting screws 129, which secure the positive terminal 121p of the capacitor 121 and the positive terminal 122p of the capacitor 122, are brought into contact with the capacitor connection sections 156pf, 157pf on the front surface of the positive conductor 152. Moreover, the capacitor connection sections 156nf, 157nf, which protrude in the forward (+Y) direction from the negative conductor 153, are disposed so that the capacitor mounting screws 129, which secure the negative terminal 121n of the capacitor 121 and the negative terminal 122n of the capacitor 122, are brought into contact with a conductor in a virtual plane identical with the front surface of the positive conductor 152. The capacitor connection sections 156nf, 157nf are separate from the negative conductor 153 and connected to the negative conductor 153 by the same method as for the capacitor connection sections 156p, 157p. The capacitor connection sections 156nf, 157nf are provided with holes into which the capacitor mounting screws 129 are driven. The positive conductor 152 is provided with openings 156h, 157h that prevent the protruding negative capacitor connection sections 156nf, 157nf from coming into contact with the positive conductor 152.

At the joint between the main circuit busbar assembly 151 and the fuses 131, 132, the first terminal 131a of the positive fuse 131 is brought into contact with the fuse connection section 158 on the front surface of the positive conductor 152. Further, the fuse connection section 159, which protrudes in the forward (+Y) direction from the negative conductor 153, is disposed so that the first terminal 132a of the negative fuse 132 is brought into contact with a conductor in a virtual plane (second virtual plane) identical with the front surface of the positive conductor 152. The fuse connection section 159 is separate from the negative conductor 153 and connected to the negative conductor 153 by the same method as for the capacitor connection sections 156p, 157p. The fuse connection section 159 is provided with a hole into which the fuse mounting screw 139 is driven. The positive conductor 152 is provided with an opening 159h that prevents the protruding negative fuse connection section 159 from coming into contact with the positive conductor 152.

As the first terminal 131a of the positive fuse 131 and the first terminal 132a of the negative fuse 132 are brought into contact with the main circuit busbar assembly 151 in the same virtual plane, it is easy to mount the fuses 131, 132 and easy to handle the main circuit busbar assembly 151.

Further, at the joint between the main circuit busbar assembly 151 and the fuses 131, 132, the fuse mounting screw 139, which secures the first terminal 132a of the negative fuse 132, is brought into contact with the fuse connection section 158 on the rear surface of the negative conductor 153. Moreover, the fuse connection section 158b, which protrudes in the rearward (−Y) direction from the negative conductor 153, is disposed so that the fuse mounting screw 139, which secures the first terminal 131a of the positive fuse 131, is brought into contact with a conductor in a virtual plane identical with the rear surface of the negative conductor 153. The fuse connection section 158b is separate from the positive conductor 152 and connected to the positive conductor 153 by the same method as for the capacitor connection sections 156p, 157p. The fuse connection section 158b is provided with a hole into which the fuse mounting screw 139 is driven. The negative conductor 153 is provided with an opening 158h that prevents the protruding positive fuse connection section 158b from coming into contact with the negative conductor 153.

From up to down (in the −Z direction), the external alternating-current terminal 154T, the power semiconductor module 111, the power semiconductor module 112, the capacitor 121, the capacitor 122, and the fuse connection sections 158, 159 are disposed in the order named. This makes it possible to reduce the horizontal size (X direction and Y direction) of the power conversion unit 101. Further, the power semiconductor modules 111, 112 in the present embodiment have the same structure and are longer in Z direction than in X direction. The power semiconductor module 112 is positioned adjacent to and in the downward (−Z direction) of the power semiconductor module 111. This reduces the X-direction size of the power conversion unit 101 as compared to the case where the two power semiconductor modules are arranged in a horizontal direction. On the surface (XZ plane) of the main circuit busbar assembly 151, the longitudinal direction of the power semiconductor modules 111, 112 is oriented in the longitudinal direction of the main circuit busbar assembly 151. If, for example, the distance from the alternating-current terminal 111ac in the power semiconductor module 111 to the positive terminal 111p and the negative terminal 111n and the distance from the alternating-current terminal 112ac in the power semiconductor module 112 to the positive terminal 112p and the negative terminal 112n are the terminal-to-terminal distance, the terminal-to-terminal distance is longer than the widths (X-direction length) of the power semiconductor modules 111, 112. Further, the terminal-to-terminal distance in the present embodiment is greater than the width of the main circuit busbar assembly 151 (length in transverse direction, that is, X-direction length). This reduces the X-direction size of the power conversion unit 101.

As the power conversion unit 101 is configured as described above, it is possible to reduce the footprint of a power conversion device, such as the UPS 2.

As the power semiconductor modules 111, 112 are disposed in the Z direction and oriented in an opposite direction from each other, the path of a current flowing in the power semiconductor module 111 is different from the path of a current flowing in the power semiconductor module 112. Therefore, the currents might be imbalanced. A configuration for avoiding such an imbalance is described below.

First of all, a case where a current flows from the alternating-current side of the main circuit busbar assembly 151 to the direct-current side will be described.

Figure 14:
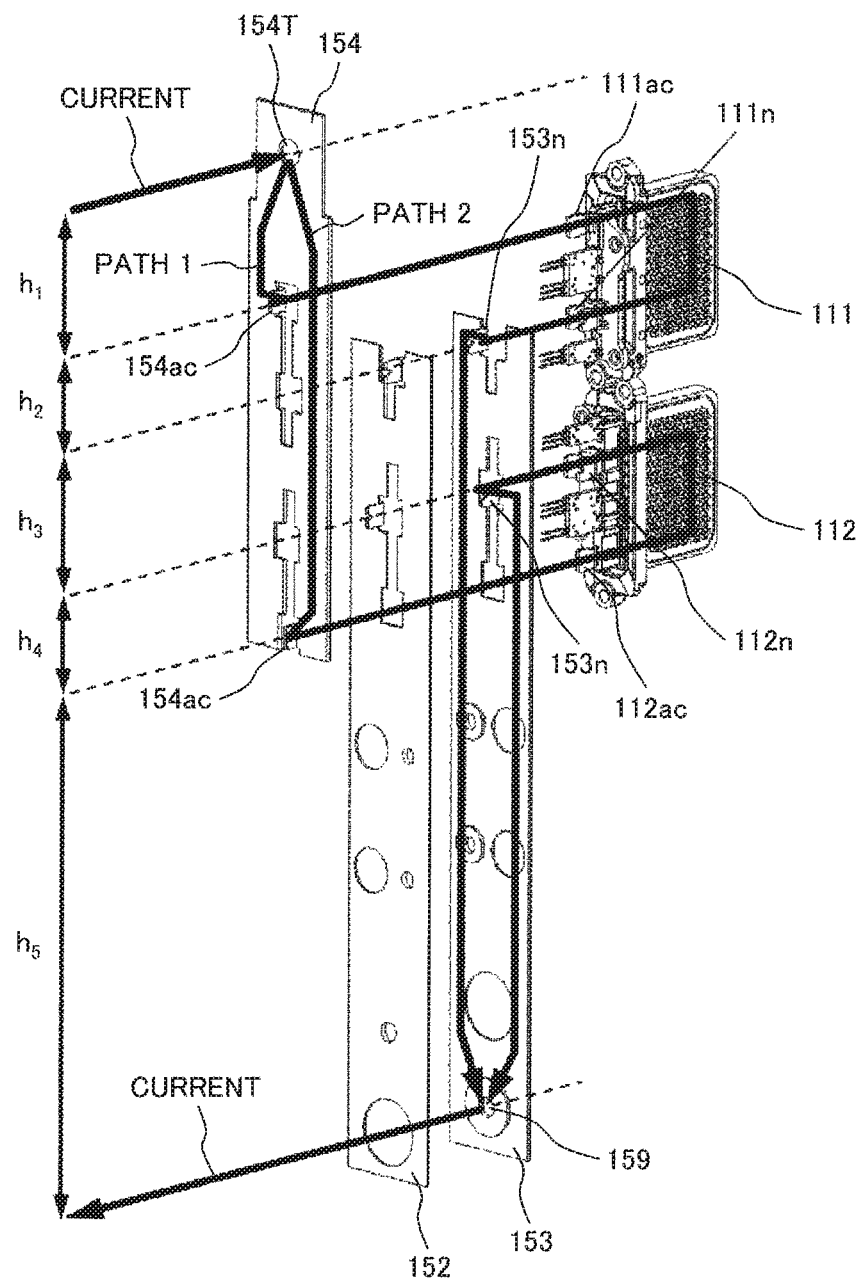
FIG. 14 is a diagram illustrating the paths of currents flowing from an external alternating-current terminal 154T in the main circuit busbar assembly 151 to a negative fuse connection section 159.

FIG. 14 is a diagram illustrating the paths of currents flowing from the external alternating-current terminal 154T in the main circuit busbar assembly 151 to the negative fuse connection section 159.

For zoning purposes, line segments $h_1$ to $h_5$ are defined with reference to the locations of the external alternating-current terminal 154T existing in the longitudinal direction of the main circuit busbar assembly 151, the alternating-current terminal 111ac of the first power semiconductor module 111, the positive and negative terminals 111p, 111n of the first power semiconductor module 111, the positive and negative terminals 112p, 112n of the second power semiconductor module 112, the alternating-current terminal 112ac of the second power semiconductor module 112, and the fuse connection section 158 or 159.

Here, as a steady state, let us assume a situation where the IGBT of the lower arm in each of the power semiconductor modules 111, 112 is ON while a current flows to the external alternating-current terminal 154T. In this state, the current flows from the external alternating-current terminal 154T through the alternating-current conductor 154 to the IGBT of the lower arm in the power semiconductor modules 111, 112, to the negative conductor 153, and to the negative fuse connection section 159 in the order named. For purposes of explanation, the current path is divided into path 1 and path 2. Path 1 is the path of the current flowing through the first power semiconductor module 111. Path 2 is the path of the current flowing through the second power semiconductor module 112.

Here, it is assumed that the positive conductor 152, the negative conductor 153, and the alternating-current conductor 154 have the same impedance per unit length, and that the impedance is $Z_C$. Further, it is assumed that the power semiconductor modules 111, 112 have the same impedance, and that the impedance is $Z_M$. In this instance, the impedance $Z_1$ of path 1 and the impedance $Z_2$ of path 2 are expressed by the following equations by using line segments $h_1$ to $h_5$.

$$Z_1 = h_1 Z_C + Z_M + (h_3 + h_4 + h_5) Z_C \quad (1)$$

$$Z_2 = (h_1 + h_2 + h_3 + h_4) Z_C + Z_M + (h_4 + h_5) Z_C \quad (2)$$

From Equations (1) and (2), the imbalance between the impedances $Z_2 - Z_1$ is expressed by the following equation.

$$Z_2 - Z_1 = (h_2 + h_4) Z_C \quad (3)$$

As indicated in Equation (3), the imbalance between the impedances of paths 1 and 2 in the steady state is determined by the imbalance between path lengths $h_2 + h_4$. The imbalance between the path lengths arises because the power semiconductor module 112 is oriented in an opposite direction from the power semiconductor module 111.

A current imbalance arises in accordance with the ratio of an impedance imbalance to the impedance of all paths. Therefore, the current imbalance can be reduced when the imbalance between the path lengths $h_2 + h_4$ is sufficiently smaller than the total path length. That is to say, the following relational expression is obtained.

$$h_2 + h_4 \ll h_1 + h_3 + h_5 \quad (4)$$

In other words, $h_2 + h_4$ is sufficiently smaller than a value obtained by subtracting h2+h4 from the distance between the external alternating-current terminal 154T and the fuse connection sections 158, 159. Here, as mentioned earlier, the first power semiconductor module 111 and the second power semiconductor module 112 need to be positioned close to each other. Therefore, $h_3$ needs to be short. Thus, Equation (4) signifies that $h_1$ and $h_5$ should be sufficiently longer than $h_2$ and $h_4$. Consequently, when the external alternating-current terminal 154T and the fuse connection section 158 or 159 are provided on both ends of the main circuit busbar assembly 151, the currents flowing in the first power semiconductor module 111 and the second power semiconductor module 112 can be balanced in the steady state. It should be noted that $h_2$ and $h_4$ may be equal.

Meanwhile, if Equation (4) is not sufficiently satisfied due, for instance, to dimensional limitations on the overall structure of a power conversion device, the current imbalance becomes great. In such an instance, the imbalance between path lengths can be reduced by adjusting the conductor thickness of an imbalanced alternating-current conductor 154.

Here, it is assumed that the positive conductor 152 and the negative conductor 153 are equal in thickness, and that the thickness of the alternating-current conductor 154 is n times the thickness of the positive conductor 152 and negative conductor 153. The impedance $Z_1$ of path 1 and the impedance $Z_2$ of path 2 are expressed by the following equations.

$$Z_1 = \frac{h_1}{n} Z_C + Z_M + (h_3 + h_4 + h_5) Z_C \quad (5)$$

$$Z_2 = \frac{h_1 + h_2 + h_3 + h_4}{n} Z_C + Z_M + (h_4 + h_5) Z_C \quad (6)$$

From Equations (5) and (6), n for equalizing $Z_1$ and $Z_2$ is expressed by the following equation.

$$n = 1 + \frac{h_2 + h_4}{h_3} \quad (7)$$

As described above, when the ratio of the thickness of the positive conductor 152 and negative conductor 153 to the thickness of the alternating-current conductor 154 is equal to n, which is expressed by Equation (7), the impedance imbalance can be suppressed to avoid the imbalance between the current flowing in path 1 and the current flowing in path 2.

Next, a case where a current flows from the direct-current side of the main circuit busbar assembly 151 to the alternating-current side will be described.

Figure 15:
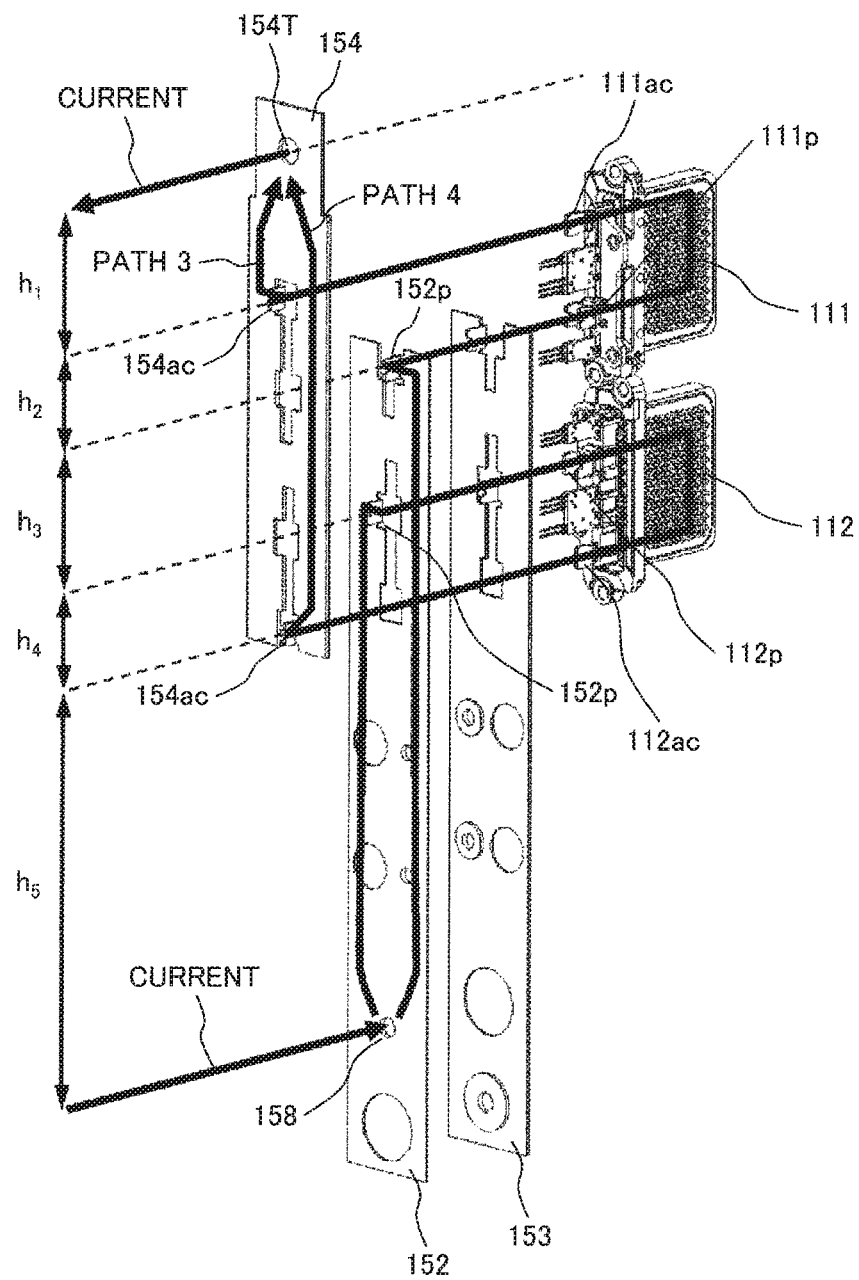
FIG. 15 is a diagram illustrating the paths of currents flowing from a positive fuse connection section 158 in the main circuit busbar assembly 151 to the external alternating-current terminal 154T.

FIG. 15 is a diagram illustrating the paths of currents flowing from the positive fuse connection section 158 in the main circuit busbar assembly 151 to the external alternating-current terminal 154T.

Here, as a steady state, let us assume a situation where the IGBT of the upper arm in each of the power semiconductor modules 111, 112 is ON while a current flows from the external alternating-current terminal 154T. In this state, the current flows from the fuse connection section 158 through the positive conductor 152 to the IGBT of the upper arm in the power semiconductor modules 111, 112, to the alternating-current conductor 154, and to the external alternating-current terminal 154T in the order named. For purposes of explanation, the current path is divided into path 3 and path 4. Path 3 is the path of the current flowing through the first power semiconductor module 111. Path 4 is the path of the current flowing through the second power semiconductor module 112. In this instance, path 3 is equal in length to path 1, and path 4 is equal in length to path 2. Therefore, when the positive conductor 152, the negative conductor 153, and the alternating-current conductor 154 are equal in thickness, the conditions for the length of each zone are as expressed by Equation (4) above. Further, the conditions for a case where the alternating-current conductor 154 is different in thickness from the positive conductor 152 and the negative conductor 153 are as expressed by Equation (7) above.

Figure 16:
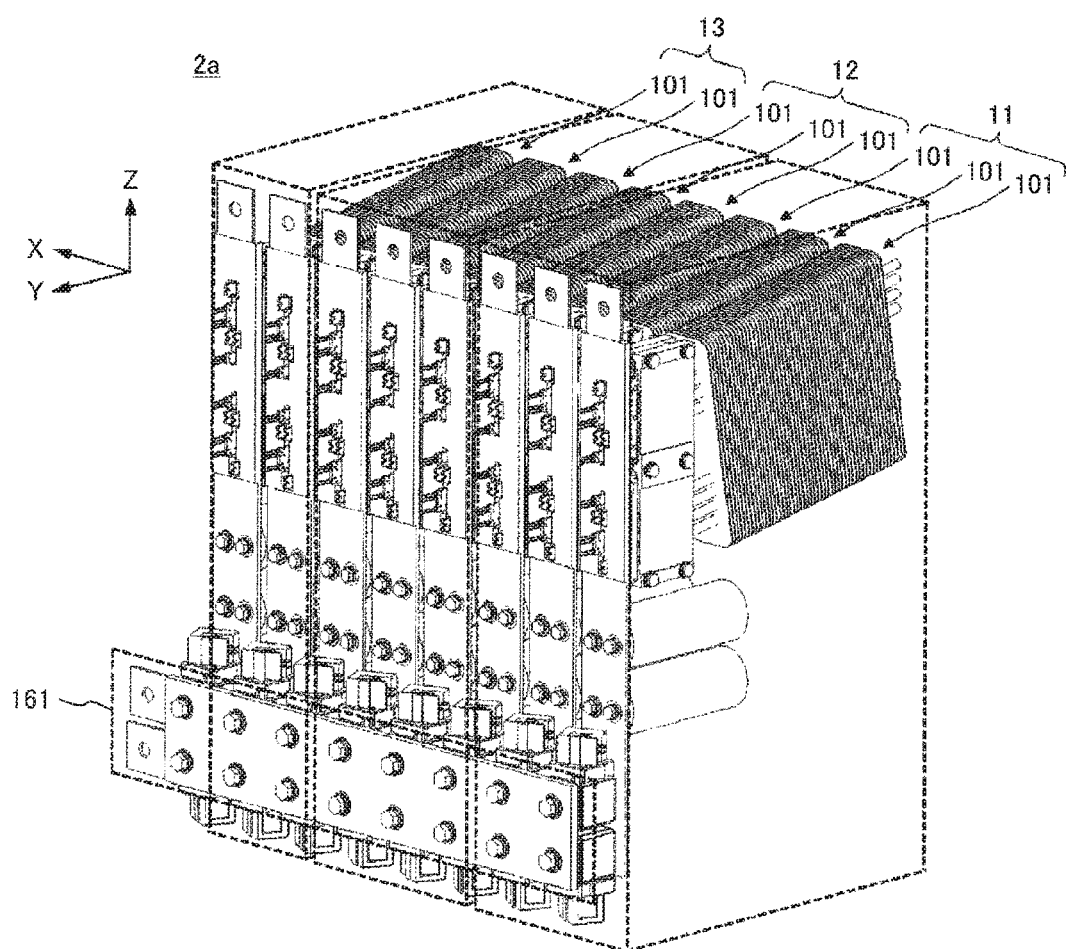

FIG. 16 is a perspective view illustrating a configuration of the power conversion section 2a.

The power conversion section 2a is disposed in a housing (not shown) of the UPS 2. An open/close door (not shown), which is to be opened for the maintenance of the UPS 2, is attached to the front surface of the housing of the UPS 2, that is, positioned in the Y-axis direction of the power conversion section 2a. Opening the open/close door makes it easy to access the front surface of the power conversion section 2a.

The power conversion section 2a includes a plurality of power conversion units 101, which are disposed in the X-axis direction. The converter 11 includes three power conversion units, which respectively correspond to the three phases of commercial power. Similarly, the inverter 12 includes three power conversion units 101, which respectively correspond the three phases.

The step-up chopper 13 includes two power conversion units 101, which are connected in parallel. The step-up chopper 13 may be formed of one power conversion unit 101. If the rated power of the power semiconductor modules 110 included in the power conversion unit 101 is exceeded by electrical power required for the step-up chopper 13, N power conversion units 101 are connected in parallel to increase the permissible power N-fold. For similar purposes, the converter 11 and the inverter 12 may each include, as needed, a plurality of parallel-connected power conversion units 101 per phase.

The power conversion units 101 in the power conversion section 2a are parallel-connected through the unit coupling busbar assembly 161. The longitudinal direction of each of the power conversion units 101 is the Z direction, and the power conversion units 101 are disposed in the X direction. The longitudinal direction of the unit coupling busbar assembly 161 is the X direction, and the unit coupling busbar assembly 161 is disposed in the +Y direction of the power conversion units 101. That is to say, the longitudinal direction of each of the power conversion units 101 crosses the longitudinal direction of the unit coupling busbar assembly 161. Consequently, the power conversion units 101 can be efficiently disposed within a limited cubic volume.

The unit coupling busbar assembly 161 is assembled, by using mounting screws 169, to the second terminal 131b of the positive fuse 131 and the second terminal 132b of the negative fuse 132, which are mounted on the lower front surface of each power conversion unit 101.

Figure 17:
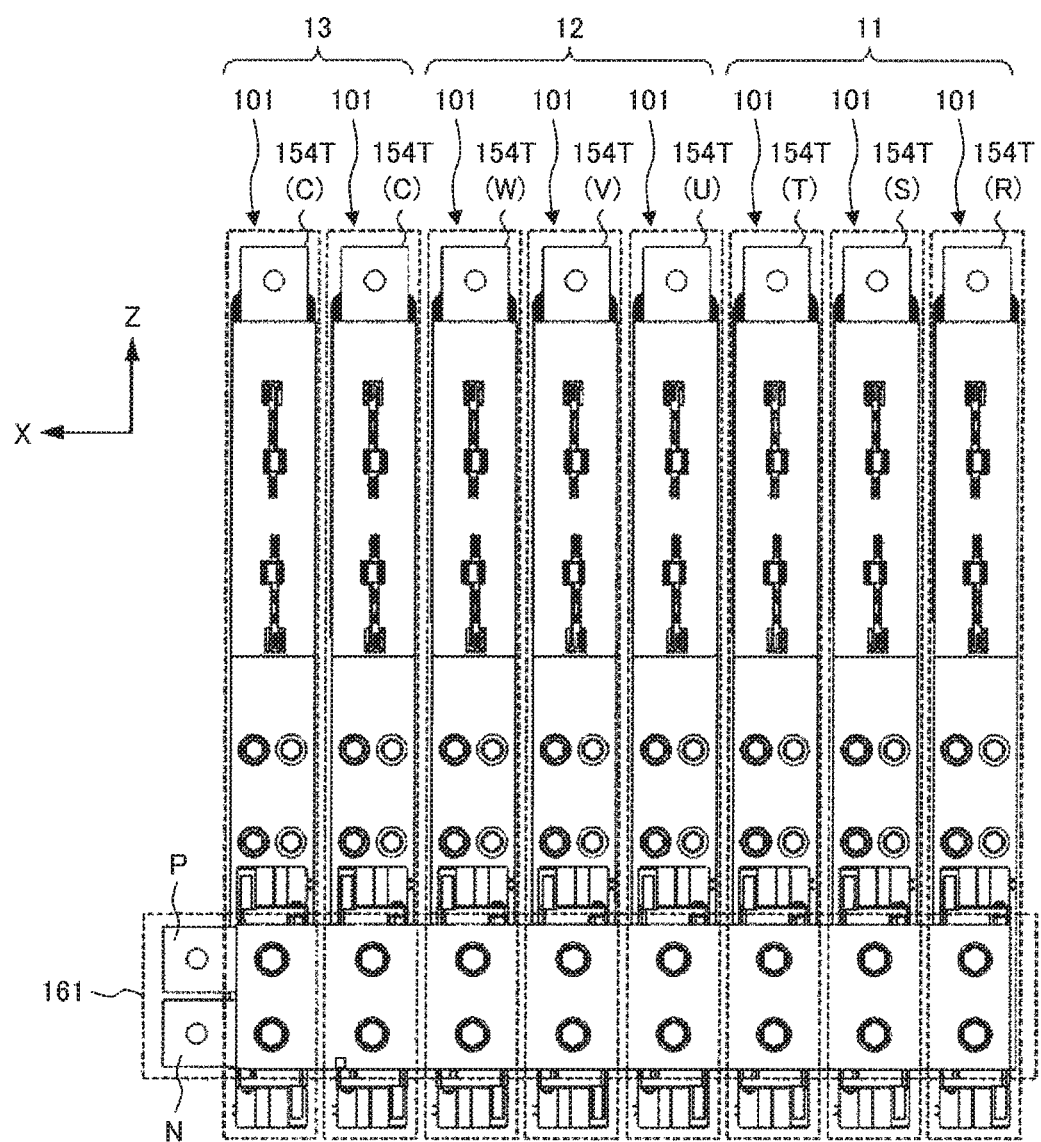

FIG. 17 is a front view illustrating the configuration of the power conversion section 2a.

The external alternating-current terminals 154T disposed on the upper ends of the power conversion units 101 respectively correspond to the R, S, and T terminals of the converter 11, the U, V, and W terminals of the inverter 12, and the C terminals (common) of the step-up chopper 13. Two terminals are disposed on the left end of the unit coupling busbar assembly 161. The upper one of these terminals corresponds to the P terminals of the converter 11, inverter 12, and step-up chopper 13, and the lower one corresponds to the N terminals of the converter 11, inverter 12, and step-up chopper 13.

When the configuration according to the above-described embodiment is employed to parallel-connect an appropriate number of power conversion units 101 in accordance with a desired amount of electrical power and the number of phases, various power conversion devices, such as the converter 11, the inverter 12, and the step-up chopper 13, can be configured in an arbitrary manner. When the power conversion unit 101 is manufactured as a minimum configuration unit, the parts for various power conversion devices can be communized to achieve cost reduction. Further, when the communized power conversion units 101 are employed and disposed in parallel, the resulting layout is in good order. This increases the ease of unit-to-unit connection wiring and provides improved overall assemblability. Moreover, the terminals, capacitor terminals, and fuse terminals for the power semiconductor modules included in the power conversion unit 101 and the unit coupling busbar assembly 161 for connecting the power conversion units are on the front surface of the power conversion device. This improves front accessibility during assembly and maintenance, thereby providing increased workability.

A method of manufacturing the power conversion section 2a will now be described. First of all, a manufacturer disposes a plurality of power conversion units 101 in the +X direction and disposes the unit coupling busbar assembly 161 in the +Y direction with respect to the power conversion units 101. Subsequently, the manufacturer connects a plurality of positive conductors 152, which are respectively included in the power conversion units 101, through a positive conductor 162 included in the unit coupling busbar assembly 161, and connects a plurality of the negative conductors 153, which are respectively included in the power conversion units 101, through a negative conductor 163 included in the unit coupling busbar assembly 161. In this manner, the power conversion section 2a is manufactured. Further, the manufacturer can manufacture, for example, the converter 11, the inverter 12, and the step-up chopper 13 by using the power conversion units 101. Moreover, the manufacturer can manufacture the UPS 2 by connecting, for example, the storage battery 14, the maintenance bypass circuit 16, and the bypass circuit 17 to a plurality of alternating-current terminals 154T, which are respectively included in the power conversion units 101.

In the power conversion unit 101, from up to down (in the −Z direction), external direct-current terminals including an external positive terminal and an external negative terminal, the power semiconductor module 111, the power semiconductor module 112, the capacitor 121, the capacitor 122, and the external alternating-current terminal 154T may be disposed in the order named. In such an instance, the external direct-current terminals are disposed on the upper end of the main circuit busbar assembly 151, and the external alternating-current terminal 154T is disposed on the lower end of the main circuit busbar assembly 151. In this case, heavy parts, such as the reactor connected to the external alternating-current terminal 154T, are disposed below the power conversion unit 101. Therefore, the distance between the external alternating-current terminal and the heavy parts can be shortened to reduce the impedance.

Terms used in this document will now be explained. A power conversion unit corresponds, for example, to the power conversion unit 101. A positive conductor corresponds, for example, to the positive conductor 152. A negative conductor corresponds, for example, to the negative conductor 153. An alternating-current conductor corresponds, for example, to the alternating-current conductor 154. A circuit connection section corresponds, for example, to the main circuit busbar assembly 151. A capacitor corresponds, for example, to the capacitors 120. A positive connection conductor corresponds, for example, to the positive conductor 162. A negative connection conductor corresponds, for example, to the negative conductor 163. Two two-level half-bridge circuits correspond, for example, to the power semiconductor modules 111, 112. Two capacitors correspond, for example, to the capacitors 121, 122. A positive fuse corresponds, for example, to the fuse 131. A negative fuse corresponds, for example, to the fuse 132. A power conversion device corresponds, for example, to the converter 11, the inverter 12, the step-up chopper 13, the power conversion section 2a, and the UPS 2. A first power semiconductor module corresponds, for example, to the power semiconductor module 111. A second power semiconductor module corresponds, for example, to the power semiconductor module 112. An external positive terminal corresponds, for example, to the fuse connection section 158. An external negative terminal corresponds, for example, to the fuse connection section 159. An external alternating-current terminal corresponds, for example, to the external alternating-current terminal 154T. A first direct-current terminal corresponds, for example, to the positive terminal 111p and the negative terminal 111n. A first positive terminal corresponds, for example, to the positive terminal 111p. A first negative terminal corresponds, for example, to the negative terminal 111n. A first alternating-current terminal corresponds, for example, to the alternating-current terminal 111ac. A second direct-current terminal corresponds, for example, to the positive terminal 112p and the negative terminal 112n. A second positive terminal corresponds, for example, to the positive terminal 112p. A second negative terminal corresponds, for example, to the negative terminal 112n. A second alternating-current terminal corresponds, for example, to the alternating-current terminal 112ac. A specific direction corresponds, for example, to the −Z direction. An array direction corresponds, for example, to the X direction. a corresponds, for example, to $h_2$. b corresponds, for example, to $h_4$. c corresponds, for example, to $h_3$.

The present invention is not limited to the above-described embodiment, and various modifications may be made without departing from the spirit of the present invention.

REFERENCE SIGNS LIST

1: Power conversion device,
2: UPS (Uninterruptible Power Supply),
11: Converter,
12: Inverter,
13: Step-up chopper,
101: Power conversion unit,
110: Power semiconductor modules,
111, 112: Power semiconductor module,
113: Air-cooling fin,
120: Capacitors,
121, 122: Capacitor,
131, 132: Fuse,
151: Main circuit busbar assembly,
152: Positive conductor,
153: Negative conductor,
154: Alternating-current conductor,
154T: External alternating-current terminal,
155: Insulator,
161: Unit coupling busbar assembly,
162: Positive conductor,
162T: External positive terminal,
163: Negative conductor,
163T: External negative terminal,
164: Insulator.

The invention claimed is:

1. A power conversion unit comprising:
a circuit connection section that includes a positive conductor having an external positive terminal, a negative conductor having an external negative terminal, and an alternating-current conductor having an external alternating-current terminal;
a first power semiconductor module that is connected to the positive conductor, the negative conductor, and the alternating-current conductor;
a second power semiconductor module that is connected to the positive conductor, the negative conductor, and the alternating-current conductor; and
a capacitor that is connected to the positive conductor and the negative conductor;
wherein the first power semiconductor module includes a first direct-current terminal and a first alternating-current terminal, the first direct-current terminal having a first positive terminal connected to the positive conductor and a first negative terminal connected to the negative conductor, the first alternating-current terminal being connected to the alternating-current conductor;
wherein the second power semiconductor module includes a second direct-current terminal and a second alternating-current terminal, the second direct-current terminal having a second positive terminal connected to the positive conductor and a second negative terminal connected to the negative conductor, the second alternating-current terminal being connected to the alternating-current conductor;
wherein the external alternating-current terminal, the first power semiconductor module, the second power semiconductor module, the capacitor, and an external direct-current terminal including the external positive terminal and the external negative terminal are arrayed on a straight line extending in the longitudinal direction of the circuit connection section;
wherein the external alternating-current terminal is disposed at one longitudinal end of the circuit connection section; and
wherein the external direct-current terminal is disposed at the other longitudinal end of the circuit connection section.

2. The power conversion unit according to claim 1,
wherein the first direct-current terminal, the first alternating-current terminal, the second direct-current terminal, and the second alternating-current terminal are arrayed on the straight line;
wherein the first direct-current terminal is disposed in a specific direction with respect to the first alternating-current terminal; and
wherein the second direct-current terminal is disposed in a direction opposite to the specific direction with respect to the second alternating-current terminal.

3. The power conversion unit according to claim 1,
wherein the positive conductor, the negative conductor, and the alternating-current conductor are shaped like a flat plate; and
wherein the positive conductor, the negative conductor, and the alternating-current conductor are stacked together via an insulator.

4. The power conversion unit according to claim 1,
wherein the distance between the first alternating-current terminal and the first direct-current terminal and the distance between the second alternating-current terminal and the second direct-current terminal are greater than the transverse length of a flat plate of the circuit connection section.

5. The power conversion unit according to claim 2,
wherein the positive conductor and the negative conductor have a predetermined thickness;
wherein the thickness of the alternating-current conductor is greater than the predetermined thickness; and
wherein the ratio n of the thickness of the alternating-current conductor to the predetermined thickness is expressed by using the distance a between the first alternating-current terminal and the first direct-current terminal, the distance b between the second direct-current terminal and the second alternating-current terminal, and the distance c between the first direct-current terminal and the second direct-current terminal.

6. The power conversion unit according to claim 5,
wherein the relationship between n, a, b, and c is expressed by $n=1+(a+b)/c$.

7. The power conversion unit according to claim 1,
wherein the positive conductor, the negative conductor, and the alternating-current conductor are equal in thickness; and
wherein the sum of the distance between the first alternating-current terminal and the first direct-current terminal and the distance between the second direct-current terminal and the second alternating-current terminal is smaller than a value obtained by subtracting the sum from the distance between the external alternating-current terminal and the external direct-current terminal.

8. The power conversion unit according to claim 1,
wherein the external alternating-current terminal, the first power semiconductor module, the second power semiconductor module, the capacitor, and the external direct-current terminal are sequentially disposed on the straight line.

9. The power conversion unit according to claim 1,
wherein the external direct-current terminal, the first power semiconductor module, the second power semiconductor module, the capacitor, and the external alternating-current terminal are sequentially disposed on the straight line.

10. The power conversion unit according to claim 1,
wherein the first negative terminal is disposed in an array direction that is the transverse direction of the circuit connection section with respect to the first positive terminal; and
wherein the second negative terminal is disposed in a direction opposite to the array direction with respect to the second positive terminal.

11. The power conversion unit according to claim 1,
wherein the capacitor includes two capacitors; and
wherein the two capacitors are disposed on the straight line.

12. The power conversion unit according to claim 1,
wherein the first power semiconductor module and the second power semiconductor module each include a two-level half-bridge circuit.

13. The power conversion unit according to claim 1, further comprising:
at least one of a positive fuse and a negative fuse, the positive fuse being a fuse connected to the external positive terminal, the negative fuse being a fuse connected to the external negative terminal.

14. A power conversion device comprising:
a plurality of power conversion units;
wherein the power conversion units each include
a circuit connection section including a positive conductor having an external positive terminal, a negative conductor having an external negative terminal, and an alternating-current conductor having an external alternating-current terminal,
a first power semiconductor module including a first positive terminal connected to the positive conductor, a first direct-current terminal having a first negative terminal connected to the negative conductor, and a first alternating-current terminal connected to the alternating-current conductor,
a second power semiconductor module including a second positive terminal connected to the positive conductor, a second direct-current terminal having a second negative terminal connected to the negative conductor, and a second alternating-current terminal connected to the alternating-current conductor, and
a capacitor that is connected to the positive conductor and the negative conductor;
wherein the external alternating-current terminal, the first power semiconductor module, the second power semiconductor module, the capacitor, and an external direct-current terminal including the external positive terminal and the external negative terminal are arrayed on a straight line extending in the longitudinal direction of the circuit connection section;
wherein the external alternating-current terminal is disposed at one longitudinal end of the circuit connection section; and
wherein the external direct-current terminal is disposed at the other longitudinal end of the circuit connection section.

15. A power conversion unit comprising:
a circuit connection section that includes a plurality of conductors having different potentials, that is, at least a positive conductor having an external positive terminal, a negative conductor having an external negative terminal, and an alternating-current conductor having an external alternating-current terminal;
a power semiconductor module connected between some of the plurality of conductors; and
a capacitor connected between some of the plurality of conductors;
wherein the external alternating-current terminal, the power semiconductor module, the capacitor, and an external direct-current terminal including the external positive terminal and the external negative terminal are arrayed on a straight line extending in the longitudinal direction of the circuit connection section;
wherein the external alternating-current terminal is disposed at one longitudinal end of the circuit connection section; and
wherein the external direct-current terminal is disposed at the other longitudinal end of the circuit connection section.

16. The power conversion unit according to claim 15,
wherein the external alternating-current terminal, the power semiconductor module, the capacitor, and the external direct-current terminal are sequentially disposed on the straight line.

17. The power conversion unit according to claim 15,
wherein the external direct-current terminal, the power semiconductor module, the capacitor, and the external alternating-current terminal are sequentially disposed on the straight line.

18. The power conversion unit according to claim 15,
wherein the positive conductor, the negative conductor, and the alternating-current conductor are shaped like a flat plate; and
wherein the positive conductor, the negative conductor, and the alternating-current conductor are stacked together via an insulator.

19. The power conversion unit according to claim 15,
wherein a conversion circuit formed of the circuit connection section, the power semiconductor module, and a capacitor is a two or more multi-level conversion circuit.

20. A power conversion device comprising:
a plurality of power conversion units;
wherein the power conversion units each include
a circuit connection section including a plurality of conductors having different potentials, that is, at least a positive conductor having an external positive terminal, a negative conductor having an external negative terminal, and an alternating-current conductor having an external alternating-current terminal,
a power semiconductor module connected between some of the plurality of conductors; and
a capacitor connected between some of the plurality of conductors;
wherein the external alternating-current terminal, the power semiconductor module, the capacitor, and an external direct-current terminal including the external positive terminal and the external negative terminal are arrayed on a straight line extending in the longitudinal direction of the circuit connection section;
wherein the external alternating-current terminal is disposed at one longitudinal end of the circuit connection section; and
wherein the external direct-current terminal is disposed at the other longitudinal end of the circuit connection section.

* * * * *